May 1, 1923.

A. E. OSBORN 1,453,478

CONE GEAR TRANSMISSION MECHANISM

Original Filed April 25, 1921   3 Sheets-Sheet 1

Inventor
Alden E. Osborn

May 1, 1923.

A. E. OSBORN 1,453,478

CONE GEAR TRANSMISSION MECHANISM

Original Filed April 25, 1921   3 Sheets-Sheet 2

Inventor
Alden E. Osborn.

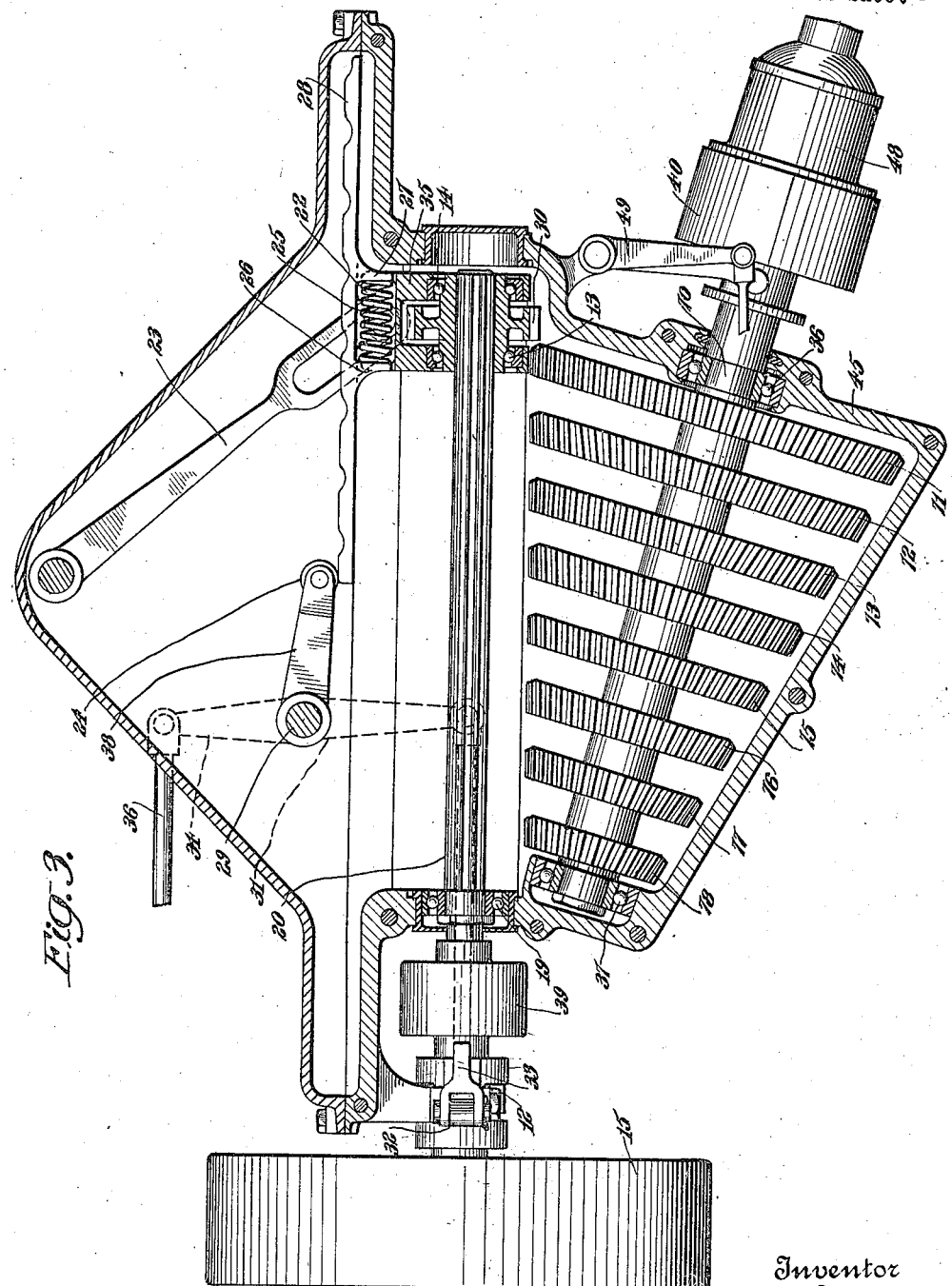

Patented May 1, 1923.

1,453,478

UNITED STATES PATENT OFFICE.

ALDEN E. OSBORN, OF NEW YORK, N. Y.

CONE-GEAR TRANSMISSION MECHANISM.

Application filed April 25, 1921, Serial No. 464,405. Renewed July 31, 1922. Serial No. 578,855.

*To all whom it may concern:*

Be it known that I, ALDEN E. OSBORN, a citizen of the United States of America, and a resident of New York, county of the Bronx, and State of New York, have invented certain new and useful Improvements in a Cone-Gear Transmission Mechanism, of which the following is a specification.

This invention relates particularly to improvements in a type of transmission gear which give a relatively large number of different speeds thru the use of a sliding pinion which can be brought into mesh with a number of different sized gears mounted on a shaft adjacent to the shaft on which the pinion is mounted, these different sized gears being arranged in the form of a cone. Certain of the features disclosed in this specification, especially the method of supporting the pinion and of operating the clutch, can be used in connection with a different arrangement of the gearing. The gearing herein set forth, giving as it does a large number of speeds, permits of the use, when it is applied to a motor vehicle, of a relatively small engine with great efficiency or even of an engine operating at a constant speed—the vehicle speed being regulated by the action of the transmission and clutch. A peculiar feature of my invention is that the sliding pinion, while rigidly supported, does not transmit any of the gear thrust to its driving shaft and consequently the shaft and other revolving driving parts can be very light and the changes of speed can be easily made.

In the accompanying drawings I have, for the purposes of disclosure, illustrated my invention in two forms only but would have it understood that it is susceptible of embodiment in other forms without departure from the true spirit and scope of the invention as defined in the appended claims. In these drawings:

Figure 2 represents a cross sectional view of Fig. 1 taken approximately on the line 2—2 and Figure 3 represents a partial sectional plane view of a modification of Fig. 1.

Figure 1:
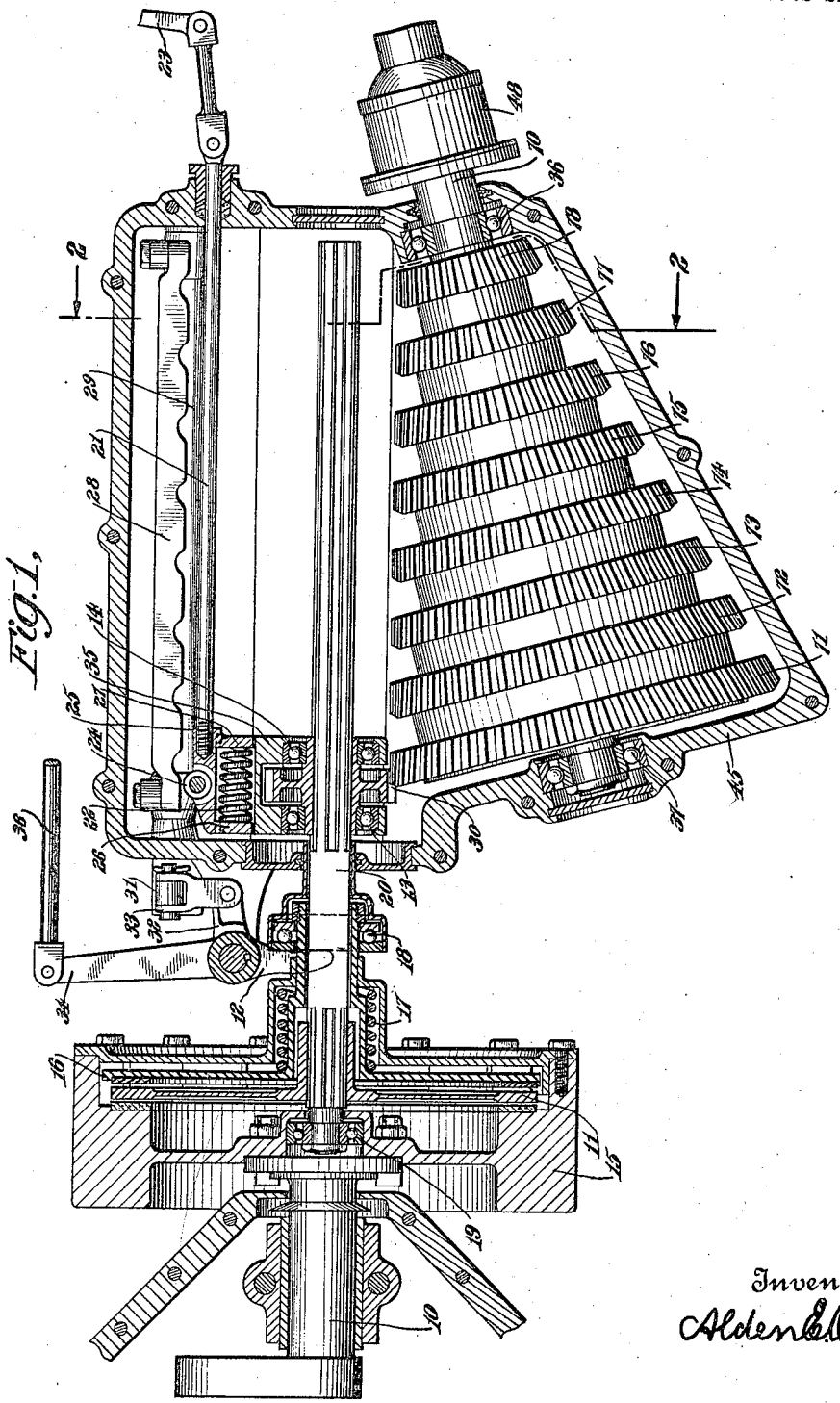
Figure 1 represents a partial sectional plane view of one form of my invention.

Referring to Fig. 1, 10 indicates the shaft of the motor or engine, or a shaft connected thereto, which shaft carries the fly-wheel or clutch casing 15. This casing 15 contains a friction clutch adapted to connect or disconnect, as required, the main driving shaft 20 of the speed change gearing with the primary driving shaft 10 just referred to. The friction clutch is shown as comprising a single driven disc 11 revolving with the driving shaft 20 and co-operating friction faces on the fly-wheel or casing 15 and on the movable disc 16 which disc is normally pressed by a spring 17 toward the fly-wheel, so as to clamp the disc 11 between the two friction surfaces, but can be moved against the action of the spring to disengage the friction surfaces (as shown) by means of the lever 12 which acts against the thrust bearing 18. This friction clutch mechanism can, of course, be modified in any way desired such as by the addition of a number of friction discs on both the driving and driven members or it may even be of an entirely different type. The main driving shaft 20 is shown as supported by a bearing 19 at its forward end and its other end extends into the gear casing 45 and is provided with suitable keys or is of a square section so that the driving gear 30 is caused to rotate with it but can be slid into different positions. This driving gear is supported by two bearings 13 and 14 in the carrier 35 which is arranged to slide in a channel or guideway in the casing 45 parallel with the axis of the shaft 20 so that the gear would be rigidly supported by these bearings and the carrier independently of the shaft. The gear carrier 35 is moved along the guideway by means of the spring 22 which is held in a socket in the carrier and is engaged at each end by means of the fingers 26 and 27 on the member 25 which is fastened to the rod 21 that passes thru the casing 45 and is worked by the lever 23.

Figure 2:
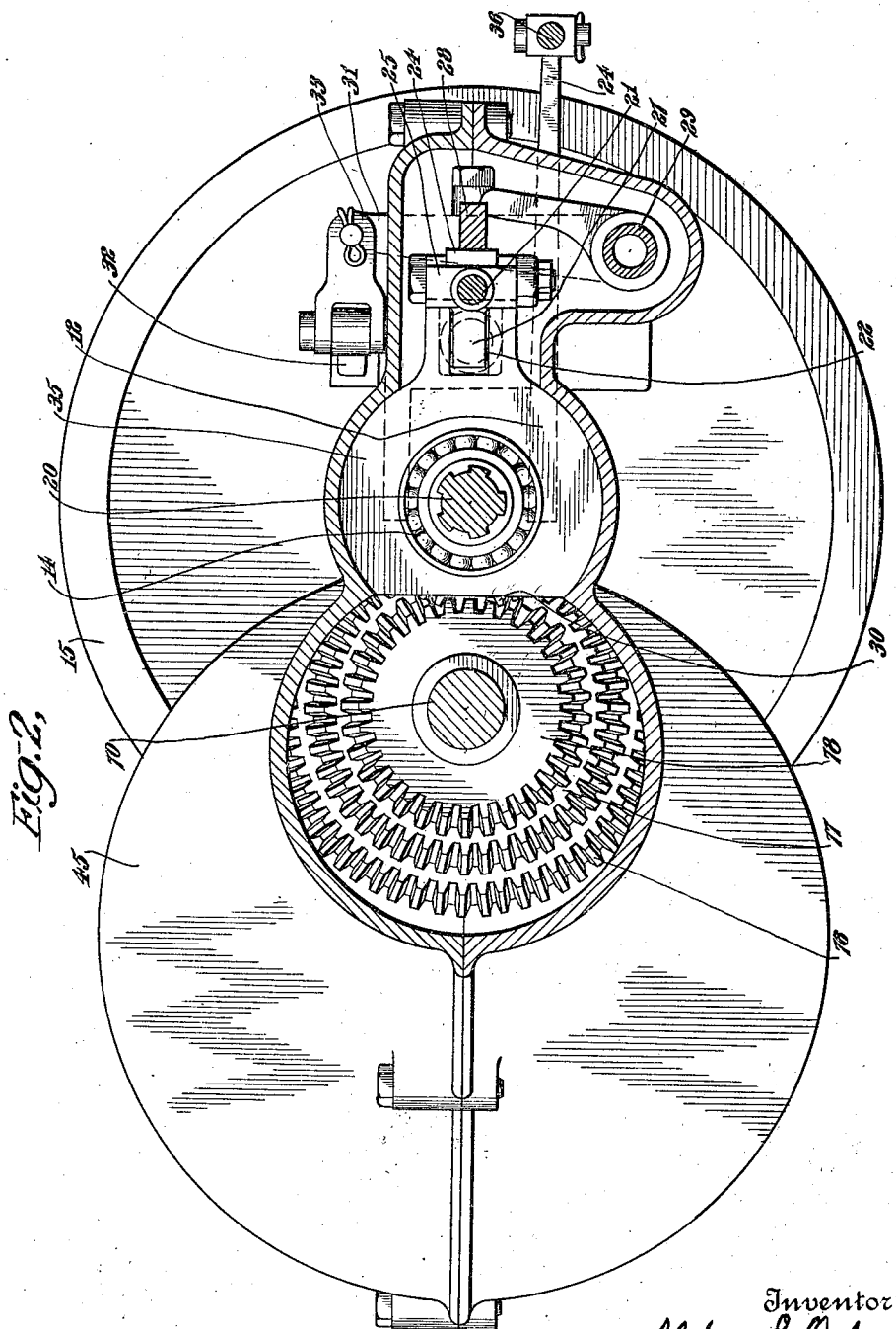

The member 25 also carries a roller 24 which engages the clutch operating cam bar 28 that is mounted on the shaft 29 which actuates the clutch collar lever 12 thru the medium of the levers 31 and 32 and the link 33. As it may in some cases be desirable to operate the clutch independently of this mechanism I have shown a lever 34, that may be operated thru the rod 46 by any convenient means, attached to the lever 12. The driving gear 30 is adapted to mesh with any of the cone gears 71 to 78 on the driven shaft 70 which is carried in bearings 36 and 37 in the casing 45 and is connected, thru the universal joint 48, to the traction wheels of the vehicle in which this transmission is fitted or to the other apparatus that it is desired to drive. As similar numerals of reference indicate similar parts in all the figures the cross sectional view of Fig. 1 shown in Fig. 2 can be readily understood without further description. The operation of this transmission is as follows:—
When the parts are in the position shown in Fig. 1 no power would be transmitted from the shaft 10 to the driven shaft 70 because of the friction clutch being disengaged thru the member 25 being in such a position that the roller 24 is out of the notches of the cam bar 28. This neutral position, I prefer, occurs with the gear 30 in partial mesh with the driven cone gear 71 (or any other of the cone gears with which it happens to be working) so that the driven shaft will be rotated again, as soon as the member 25 is moved to bring the gear 30 into its working position and the clutch into engagement, without the shock due to the clashing of the gear teeth that might occur if the gears were out of engagement as in Fig. 2. When the gear 30 is in driving mesh with the gear 71 and the clutch engaged and it is desired to give the driven shaft a greater speed, the movement of the member 25 backward would first disengage the clutch and then slide the gear 30 from the gear 71 and into mesh with the gear 72 when the further movement of the member 25 would again engage the clutch because of the roller 24 going into another notch in the cam bar. The same operation would occur when going into another speed or when reducing the speed of the driven shaft by moving the member 25 the other way. The spring 22 has two very important functions and is the equivalent of the spring 22 disclosed in my patent for reverse gearing, No. 1,441,520, filed Aug. 25, 1920, dated Jan. 9, 1923. In the first place it enables the gears to be readily engaged even if they come together with their teeth abutting at the ends and in the second place it permits the parts to be moved so as to engage a different gear ratio even tho the full power of the engine is being applied at the time it is desired to make the change. Thus if the gear teeth abut the spring 22 would compress and allow the member 25 to move so that the roller 24 would go into the notch for the particular gear which is to be engaged and the shaft 20 would be slightly rotated, allowing the gears to be engaged by the spring's action, while if gear parts are under so much driving pressure that they cannot be moved thru the normal action of the member 25, the spring 22 would allow this member to move and thus release the friction clutch, thru the roller 24 being pressed out of its bar notch, which, as the shaft 20 would then be freed of all driving pressure, would in turn relieve all the other parts and let them move freely to the position desired. Thus it will be seen that with this transmission mechanism the variations in speed can all be obtained by the operation of a single controlling member which may be either directly manually operated or may be, as might be preferable with a very large mechanism, operated by some kind of power which in turn could be manually controlled with slight effort. If desired the clutch can, as hereinbefore set forth, be controlled independently of the sliding of the member 25 and give a neutral position without actuating that member.

In Fig. 3 is shown a form of my transmission mechanism operating on the same principles as the mechanism just described but containing certain modifications in construction. For instance the position of the driven gears 71 to 78 has been reversed and the bearing 19 for the driving shaft has been mounted in the casing 45. The member 25 also carries the cam bar 28 while the roller 24 is carried by the lever 38 that is mounted on the shaft 29 which controls the engagement of the friction clutch thus reversing the previously described arrangement. Another change is that the member 25 moves more directly by the lever 23 which is within the casing 45 instead of being outside of it. I have also shown a universal or flexible joint 39 between the driving shaft 20 and the friction clutch so as to allow for a small lack of alignment between the gear box and clutch shaft. It will be noticed that with the mechanism of Figs. 1 and 2 I have not provided any means for obtaining a reverse motion such as would be desirable when the device was used with a motor vehicle. In Fig. 3, however, I have shown a planetary gear 40 between the driven shaft 70 and the universal joint 48 which is brought into action by the lever 49 when the reverse is desired. The details of this gear are not illustrated as it does not form any part of my present invention and it is shown simply to make it clear how a reverse can be fitted should it be desired.

Having thus described my invention, I claim as new and desire to secure by Letters Patent:—

1. In a transmission gearing the combination of a primary driving member, a driving element, and a driven element, a friction clutch adapted to connect or disconnect said primary driving member and said driving element, a driving gear slidably mounted on said driving element, gears having connection with said driven element and adapted to mesh with the driving gear, a stationary frame having guideways substantially parallel with the axis of the said driving element, a carrier slidably mounted on said guideways, and bearings for supporting said driving gear independently of said driving element, and means for moving said carrier along said guideways to bring said driving gear into mesh with one or another of said gears connected with the said driven element.

2. In a transmission gearing the combination of a primary driving member, a driving element, and a driven element, a friction clutch adapted to connect or disconnect said primary driving member and said driving element, a driving gear slidably mounted on said driving element, gears having connection with said driven element and adapted to mesh with the driving gear, a stationary frame having guideways substantially parallel with the axis of the said driving element, a carrier slidably mounted on said guideways and having bearings for supporting said driving gear independently of said driving element whereby said driving element is substantially relieved of the thrust of the said driving gear, and controllable means for moving said carrier along said guideways to bring said driving gear into mesh with one or another of said gears connected with the driven element.

3. In a transmission gearing the combination of a primary driving member, a driving element, and a driven element, controllable means to connect or disconnect said primary driving member and said driving element, a driving gear slidably mounted on said driving element, gears having connection with said driven element and adapted to mesh with the driving gear, a stationary frame having guideways substantially parallel with the axis of the said driving element, a carrier slidably mounted on said guideways and having means for supporting said driving gear substantially independently of said driving element, and controllable means for moving said carrier along said guideways to bring said driving gear into mesh with one or another of said gears connected with the driven element.

4. In a transmission gearing the combination of a primary driving member, a driving element, and a driven element, controllable means to connect or disconnect said primary driving member and said driving element, a driving gear slidably mounted on said driving element, gears having connection with said driven element and adapted to mesh with said driving gear, a movable member for operating said means to connect or disconnect said primary driving member and said driving element, and connecting means containing an elastic element between said driving gear and member whereby said driving gear is normally moved by said member without said elastic element coming into action when said member is moved to bring said driving gear into mesh with one or another of said gears connected to the driven element, and whereby, should said driving gear be detained from free movement, said member can move, thru the action of said elastic element, and operate on said means to connect or disconnect said primary driving member and said driving element.

5. In a transmission gearing the combination of a primary driving member, a driving element, and a driven element, controllable means to connect or disconnect said primary driving member and said driving element, a driving gear slidably mounted on the driving element, gears having connection with the driven element and adapted to mesh with said driving gear, a movable member for operating said means to connect or disconnect said primary driving member and said driving element, and connecting means containing an elastic element between said driving gear and member whereby said driving gear is normally moved by said member without said elastic element coming into action when said member is moved to bring said driving gear into mesh with one or another of said gears connected to the driven element and whereby, should said driving gear be detained from free movement by the ends of the gear teeth abutting, said member can move, thru the action of said elastic element, and operate on said means to connect or disconnect said primary driving member and said driving element to cause said driving element to rotate with said driving member.

6. In a transmission gearing the combination of a primary driving member, a driving element, and a driven element, controllable means to connect or disconnect said primary driving member from said driving element, a driving gear slidably mounted on the driving element, gears having connection with the driven element and adapted to mesh with said driving gear, a movable member for operating said means to connect or disconnect said primary driving member and said driving element, and connecting means containing an elastic element between said driving gear and member whereby said driving gear is normally moved by said member without said elastic element coming into action, when said member is moved to bring said driving gear out of mesh with one or another of said gears connected to the driven element, and whereby, should said driving gear be detained from free movement by the driving pressure thereon, said member can move, thru the action of said elastic element, and operate on said means to connect or disconnect said primary driving member and said driving element to cause said driving element to be released from said driving member.

7. In a transmission gearing the combination of a primary driving member, a driving element, and a driven element, controllable means to connect or disconnect said primary driving member and said driving element, a driving gear slidably mounted on the driving element, gears having connection with the driven element and adapted to mesh with said driving gear, a movable member for operating said means to connect or disconnect said primary driving member and said driving element, and connecting means containing an elastic element between said driving gear and member whereby said driving gear is normally moved by said member without said elastic element coming into action, when said member is moved to bring said driving gear into or out of mesh with one or another of said gears connected to the driven element, and whereby, should said driving gear be detained from free movement by the ends of the gear teeth abutting or by the driving pressure thereon, said member can move and operate on said means to connect or disconnect said primary driving member and said driving element.

8. In a transmission gearing the combination of a primary driving member, a driving element, and a driven element, controllable means to connect or disconnect said primary driving member and said driving element, a gear having driving connection with one of said elements, gears having connection with the other of said elements and adapted to mesh with the first named gear, a movable member for operating said means to connect or disconnect said primary driving member and said driving element, and connecting means containing an elastic element actuated by said member and acting to mesh the first named gear with one or another of of its coacting gears without said elastic element coming into action under normal conditions and acting to mesh the first named gear with one or another of its coacting gears when the teeth thereon abut, by the action of said elastic element allowing the movement of said member for operating the means to connect or disconnect said primary driving member and said driving element to cause said driving element to rotate with said driving member.

9. In a transmission gearing the combination of a primary driving member, a driving shaft, and a driven shaft, a clutch adapted to connect or disconnect said primary driving member and said driving shaft, a gear having driving connection with one of said shafts, gears having connection with the other of said shafts and adapted to mesh with the first named gear, a movable member for operating said clutch, and connecting means containing an elastic element actuated by said member and acting to bring into driving relation said first named gear with one or another of its coacting gears without said elastic element coming into action under normal conditions and acting to bring into driving relation said first named gear with one or another of its coacting gears when the teeth thereon abut, by the action of said elastic element allowing the movement of said member for operating the clutch to engage the same and cause said driving shaft to rotate with the said driving member.

10. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, a movable member for operating said clutch to cause the engagement thereof at spaced intervals in its movement and for bringing the first named gear into driving relation with one or another of its coacting gears at the said spaced intervals in its movement when the clutch is engaged, and an elastic element in the connection to said member for controlling the meshing of the said gears whereby said member can move to engage the said clutch should the ends of the gear teeth abut.

11. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, a movable member for operating said clutch and for bringing the first named gear into driving relation with one or another of its coacting gears and having, in the connection between it and the clutch, spaced cams to cause the engagement of the clutch at spaced intervals in its movement, and having, in the connection between it and the gear meshing means, an elastic element whereby it can move to engage the said clutch should the ends of the gear teeth abut, 12. In a transmission gearing, the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, a movable member for operating said clutch and for bringing the first named gear into driving relation with one or another of its coacting gears and having, in the connection between it and the clutch, spaced cams to cause the engagement of the clutch at spaced intervals in its movement and having, in the connection between it and the gear meshing means, an elastic element whereby it can move to disengage the said clutch should the driving pressure prevent the movement of gear meshing means.

13. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, and a movable member for operating said clutch and for bringing the first named gear into driving relation with one or another of its coacting gears and having, in the connection between it and the clutch, spaced cams to cause the engagement of the clutch at the spaced intervals of when the gears are in driving relation and to cause the disengagement of the clutch at the spaced intervals of the disengagement of the gears.

14. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, and a movable member for operating said clutch and for bringing the first named gear into driving relation with one or another of its coacting gears and having, in the connection between it and the clutch, spaced cams to cause the engagement of the clutch at the spaced intervals of when the gears are in driving relation and to cause the disengagement of the clutch at the spaced intervals of the disengagement of the gears, and means for causing the disengagement of the clutch independently of the movement of said member.

15. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, a movable member for operating said clutch and for bringing the first named gear into driving relation with one or another of its coacting gears and having, in the connection between it and the clutch, spaced cams to cause the engagement of the clutch at spaced intervals in its movement, and having, in the connection between it and the gear meshing means, an elastic element whereby it can move to engage or to disengage the said clutch should the gear parts be detained from free movement, and means for causing the disengagement of the said clutch independently of the movement of said member.

16. In a transmission gearing the combination of a primary driving member, a driving shaft, and a driven shaft, a clutch adapted to connect or disconnect said primary driving member and said driving shaft, a gear having driving connection with one of said shafts, gears having driving connection with the other of said shafts and adapted to mesh with the first named gear, and a movable member for operating said clutch and for bringing the first named gear into driving relation with one or another of its coacting gears and having, in the connection between it and the clutch, a cam bar having spaced cams and a member bearing upon said cams and acting to cause the engagement of the clutch at the spaced intervals of when the gears are in driving relation and to cause the disengagement of the clutch at the spaced intervals of the disengagement of the gears.

In witness whereof, I have hereunto set my hand this 22nd day of April, 1921.

ALDEN E. OSBORN.